(12) United States Patent
Kashina et al.

(10) Patent No.: US 11,661,994 B2
(45) Date of Patent: May 30, 2023

(54) MANUFACTURING METHOD FOR CYLINDER DEVICE

(71) Applicant: Hitachi Automotive Systems, Ltd., Ibaraki (JP)

(72) Inventors: Mitsunobu Kashina, Ayase (JP); Yoshimi Tsuburaya, Yokohama (JP)

(73) Assignee: HITACHI AUTOMOTIVE SYSTEMS, LTD., Hitachinaka (JP)

( * ) Notice: Subject to any disclaimer, the term of this patent is extended or adjusted under 35 U.S.C. 154(b) by 417 days.

(21) Appl. No.: 16/766,763

(22) PCT Filed: Sep. 25, 2018

(86) PCT No.: PCT/JP2018/035396
§ 371 (c)(1),
(2) Date: May 26, 2020

(87) PCT Pub. No.: WO2019/106924
PCT Pub. Date: Jun. 6, 2019

(65) Prior Publication Data
US 2020/0362936 A1    Nov. 19, 2020

(30) Foreign Application Priority Data
Nov. 28, 2017   (JP) .............................. JP2017-227827

(51) Int. Cl.
*F16F 9/54* (2006.01)
*B21D 19/12* (2006.01)
(Continued)

(52) U.S. Cl.
CPC ................ *F16F 9/54* (2013.01); *B21D 19/12* (2013.01); *B23K 11/002* (2013.01); *F16F 9/368* (2013.01);
(Continued)

(58) Field of Classification Search
CPC ....... B21D 19/12; B23K 11/002; H01F 13/00; F16F 9/54; F16F 9/368; F16F 2226/02; F16F 2226/048
See application file for complete search history.

(56) References Cited

U.S. PATENT DOCUMENTS 4,388,666 A * 6/1983 Kuno ...................... H01F 13/00
                                                361/149
5,348,425 A * 9/1994 Heiliger ................. E21D 15/44
                                                405/290
(Continued)

FOREIGN PATENT DOCUMENTS

JP      49-15536 B    4/1974
JP     51-101752 A    9/1976
(Continued)

OTHER PUBLICATIONS

International Search Report of PCT/JP2018/035396 dated Dec. 18, 2018.
Written Opinion of PCT/JP2018/035396 dated Dec. 18, 2018.

*Primary Examiner* — Xuan Lan Nguyen
(74) *Attorney, Agent, or Firm* — Mattingly & Malur PC

(57) ABSTRACT

A manufacturing method for a cylinder device which includes a cylinder, a piston, a piston rod, a seal member, and an installing member, the method includes: a welding step for fixing the installing member to the cylinder through electrical resistance welding; a demagnetizing step for demagnetizing at least an opening portion of the cylinder; and an assembling step for assembling the piston, the piston rod, and the seal member in the cylinder through the opening portion.

3 Claims, 8 Drawing Sheets

(51) Int. Cl.
*B23K 11/00* (2006.01)
*F16F 9/36* (2006.01)
*H01F 13/00* (2006.01)

(52) U.S. Cl.
CPC .......... *H01F 13/00* (2013.01); *F16F 2226/02* (2013.01); *F16F 2226/048* (2013.01)

(56) References Cited

U.S. PATENT DOCUMENTS

| | | | | |
|---|---|---|---|---|
| 2006/0196742 | A1* | 9/2006 | Handke | F16F 9/54 188/321.11 |
| 2007/0278726 | A1* | 12/2007 | Nagasawa | F16F 9/54 267/195 |
| 2009/0072937 | A1* | 3/2009 | Holley | H01F 13/006 335/284 |
| 2010/0206676 | A1* | 8/2010 | Obrecht | B60G 15/063 188/322.19 |
| 2011/0100981 | A1* | 5/2011 | Lim | H01F 13/006 361/267 |
| 2016/0059298 | A1* | 3/2016 | Hattori | B60G 13/005 72/333 |
| 2019/0309816 | A1* | 10/2019 | Shibata | F16F 9/32 |
| 2020/0124129 | A1* | 4/2020 | Mohammadi | F16F 9/3257 |

FOREIGN PATENT DOCUMENTS

| | | |
|---|---|---|
| JP | 2004-114108 A | 4/2004 |
| JP | 2004-332746 A | 11/2004 |
| JP | 2006-100349 A | 4/2006 |
| JP | 2006-275149 A | 10/2006 |

\* cited by examiner

MANUFACTURING METHOD FOR CYLINDER DEVICE

TECHNICAL FIELD

The present invention relates to a manufacturing method for a cylinder device.

Priority is claimed on Japanese Patent Application No. 2017-227827, filed Nov. 28, 2017, the content of which is incorporated herein by reference.

BACKGROUND ART

There are technologies for demagnetizing magnetized tires (for example, refer to Patent Literature 1).

CITATION LIST

Patent Literature

[Patent Literature 1]
Japanese Unexamined Patent Application, First Publication No. 2006-100349

SUMMARY OF INVENTION

Technical Problem

Incidentally, there is a demand for improving the sealing performance of a cylinder device.

Therefore, an object of the present invention is to provide a manufacturing method for a cylinder device capable of improving the sealing performance.

In order to achieve the above object, the present invention includes a welding step for fixing a mounting member to a cylinder through electrical resistance welding, a demagnetizing step for demagnetizing at least an opening portion of the cylinder, and an assembling step for assembling a piston, a piston rod, and a seal member to the cylinder through the opening portion.

Advantageous Effects of Invention

According to the present invention, it is possible to improve the sealing performance.

DESCRIPTION OF EMBODIMENTS

A manufacturing method for a cylinder device in an embodiment according to the present invention will be described with reference to the drawings.

Figure 1:
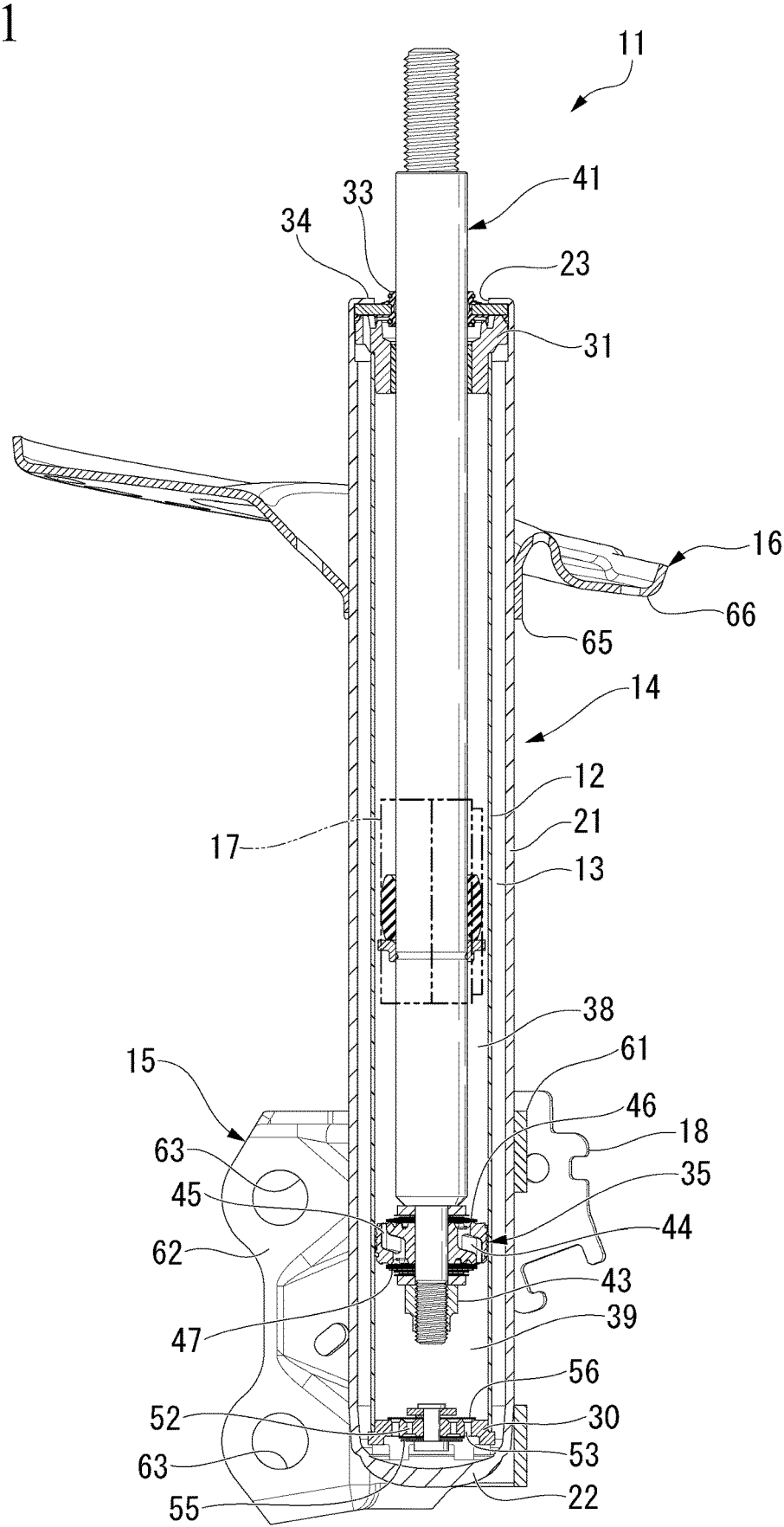
FIG. 1 is a cross-sectional view illustrating a cylinder device manufactured using a manufacturing method for the cylinder device in an embodiment according to the present invention.

FIG. 1 illustrates a cylinder device 11 to be manufactured using the manufacturing method in this embodiment. The cylinder device 11 is a shock absorber used for a suspension device of a vehicle such as an automobile or a railway vehicle, and more specifically, a shock absorber used for a strut type suspension of an automobile.

The cylinder device 11 includes a cylindrical inner cylinder 12 having a working liquid serving as a working fluid sealed therein, a bottomed cylindrical cylinder 14 in which a reservoir chamber 13 which has a diameter larger than that of the inner cylinder 12, which is provided on an outer circumference side of the inner cylinder 12, and in which a working liquid and a working gas serving as working fluids are sealed between the cylinder 14 and the inner cylinder 12 is formed, and a main bracket 15, a spring sheet 16, a harness bracket 17, and a hose bracket 18 (a mounting member), each of which are provided on an outer circumference side of the cylinder 14.

The cylinder 14 is an integrally molded product formed of one member made of a metal and has a cylindrical side wall portion 21, a bottom portion 22 configured to close one end side of the side wall portion 21 in an axial direction, and an opening portion 23 on a side of the side wall portion 21 opposite to the bottom portion 22. In other words, the cylinder 14 has one side having the opening portion 23 and the other side having the bottom portion 22. The inner cylinder 12 is an integrally formed product formed of one member made of a metal and has a cylindrical shape.

The cylinder device 11 has an annular base member 30 attached to one end portion of the inner cylinder 12 in the axial direction and an annular rod guide 31 attached to one end portion of the inner cylinder 12 in the axial direction. The inner cylinder 12 is engaged with the bottom portion 22 of the cylinder 14 via the base member 30 and engaged with the opening portion 23 side of the side wall portion 21 of the cylinder 14 via the rod guide 31.

In this state, the inner cylinder 12 is positioned with respect to the cylinder 14 in a radial direction.

The cylinder device 11 has an annular seal member 33 on a side opposite to the bottom portion 22 with respect to the rod guide 31. The seal member 33 is also fitted to an inner circumferential portion of the side wall portion 21 on the opening portion 23 side as in the same manner with the rod guide 31. A swaged part 34 plastically deformed inward in the radial direction through curling is formed at an end portion on a side opposite to the bottom portion 22 of the side wall portion 21. The seal member 33 is disposed between the swaged part 34 and the rod guide 31. The seal member 33 seals the opening portion 23 side of the cylinder 14.

The cylinder device 11 has a piston 35 provided in the cylinder 14. The piston 35 is slidably fitted to the inner cylinder 12 disposed in the cylinder 14. The piston 35 defines a first chamber 38 and a second chamber 39 in the inner cylinder 12. The first chamber 38 is provided between the piston 35 in the inner cylinder 12 and the rod guide 31 and the second chamber 39 is provided between the piston 35 in the inner cylinder 12 and the base member 30. The second chamber 39 in the inner cylinder 12 is defined with respect to the reservoir chamber 13 using the base member 30 provided on one end side of the inner cylinder 12. The first chamber 38 and the second chamber 39 are filled with an oil liquid serving as a working liquid and the reservoir chamber 13 is filled with a gas serving as a working gas and an oil liquid serving as a working liquid.

The cylinder device 11 has a piston rod 41 having one side coupled to the piston 35 and the other side extending from the cylinder 14 through the opening portion 23. The piston 35 is joined to the piston rod 41 using a nut 43. The piston rod 41 extends from the inner cylinder 12 and the cylinder 14 to the outside through the rod guide 31 and the seal member 33. The piston rod 41 is guided by the rod guide 31 to move integrally with the piston 35 with respect to the inner cylinder 12 and the cylinder 14 in the axial direction. The seal member 33 performs closure between the cylinder 14 and the piston rod 41 and restricts leakage of a working liquid in the inner cylinder 12 and a working gas and a working liquid in the reservoir chamber 13 to the outside. Thus, the seal member 33 is provided in the opening portion 23 of the cylinder 14 and seals a working fluid sealed into the cylinder 14. The swaged part 34 including the opening portion 23 is thinner than the side wall portion 21. This is to reduce the processing resources for the swaged part 34. Furthermore, in order to reduce a thickness of the swaged part 34 including the opening portion 23, processing such as swaging is performed to reduce the thickness. Thus, cutting powder and the like is highly likely to adhere to the swaged part 34.

A passage 44 and a passage 45 passing through the piston 35 in the axial direction are formed in the piston 35. The first chamber 38 can communicate with the second chamber 39 through the passages 44 and 45. The cylinder device 11 has an annular disc valve 46 capable of closing the passage 44 by coming into contact with the piston 35 on a side opposite to the bottom portion 22 of the piston 35 in the axial direction. Furthermore, the cylinder device 11 has an annular disc valve 47 capable of closing the passage 45 by coming into contact with the piston 35 on the bottom portion 22 side of the piston 35 in the axial direction.

The disc valve 46 opens the passage 44 if the piston rod 41 moves to a compression side in which an amount of introduction into the inner cylinder 12 and the cylinder 14 is increased, the piston 35 moves in a direction in which a volume of the second chamber 39 is reduced, and a pressure of the second chamber 39 becomes higher than a pressure of the first chamber 38 by a predetermined value or more, which leads to generation of a damping force at this time. The disc valve 47 opens the passage 45 if the piston rod 41 moves to an extension side in which an amount of protrusion from the inner cylinder 12 and the cylinder 14 is increased, the piston 35 moves in a direction in which a volume of the first chamber 38 is reduced, and a pressure of the first chamber 38 becomes higher than a pressure of the second chamber 39 by a predetermined value or more, which leads to generation of a damping force at this time.

The passage 52 and the passage 53 passing through the base member 30 in the axial direction are formed in the base member 30. The second chamber 39 can communicate with the reservoir chamber 13 through the passages 52 and 53. The cylinder device 11 has an annular disc valve 55 capable of closing the passage 52 by coming into contact with the base member 30 on the bottom portion 22 side of the base member 30 in the axial direction, and the cylinder device 11 has an annular disc valve 56 capable of closing the passage 53 by coming into contact with the base member 30 on a side opposite to the bottom portion 22 of the base member 30 in the axial direction.

The disc valve 55 opens the passage 52 if the piston rod 41 moves to the compression side, the piston 35 moves in the direction in which the volume of the second chamber 39 is reduced, and the pressure of the second chamber 39 becomes higher than the pressure of the reservoir chamber 13 by a predetermined value, which leads to generation of a damping force at this time. The disc valve 56 is a suction valve which opens the passage 53 if the piston rod 41 moves to the extension side, the piston 35 moves to the first chamber 38 side, and the pressure of the second chamber 39 becomes lower than the pressure of the reservoir chamber 13 and through which a working liquid flows from the reservoir chamber 13 into the second chamber 39 without substantially generating a damping force at this time.

The main bracket 15 is made of a metal and is fixed to an outer circumferential portion of the side wall portion 21 closer to the bottom portion 22 side than a central position of the cylinder 14 in the axial direction through welding. The main bracket 15 has a fitting part 61 fitted to the outer circumferential surface of the side wall portion 21 on the bottom portion 22 side and a pair of extending parts 62 extending parallel to each other from the fitting part 61 and outward in the radial direction of the cylinder 14 (FIG. 1 includes only one due to a cross-section). Each of the pair of extending parts 62 has two attaching holes 63 formed therein and the main bracket 15 is joined to a wheel side using fastening tools (not shown) inserted into the attaching holes 63.

The spring sheet 16 is made of a metal and is fixed to the outer circumferential portion of the side wall portion 21 closer to the opening portion 23 side than the central position of the cylinder 14 in the axial direction through welding. The spring sheet 16 has a fitting part 65 fitted to an outer circumferential surface of the side wall portion 21 on the opening portion 23 side and a protrusion part 66 extending outward in the radial direction from the entire circumference of the fitting part 65. The spring sheet 16 receives a lower end of a spring (not shown) configured to support a vehicle body at the protrusion part 66.

The harness bracket 17 is made of a metal and is fixed to an outer circumferential portion of the side wall portion 21 of the cylinder 14 between the main bracket 15 and the spring sheet 16 in the axial direction through welding. The harness bracket 17 is a part which supports a harness (not shown).

The hose bracket 18 is made of a metal and is fixed to an outer circumferential portion closer to the bottom portion 22 side than a central position of the side wall portion 21 of the cylinder 14 in the axial direction through welding. The hose bracket 18 is a part which supports a brake hose (not shown).

The manufacturing method for the cylinder device 11 in this embodiment will be described below.

Figure 2:
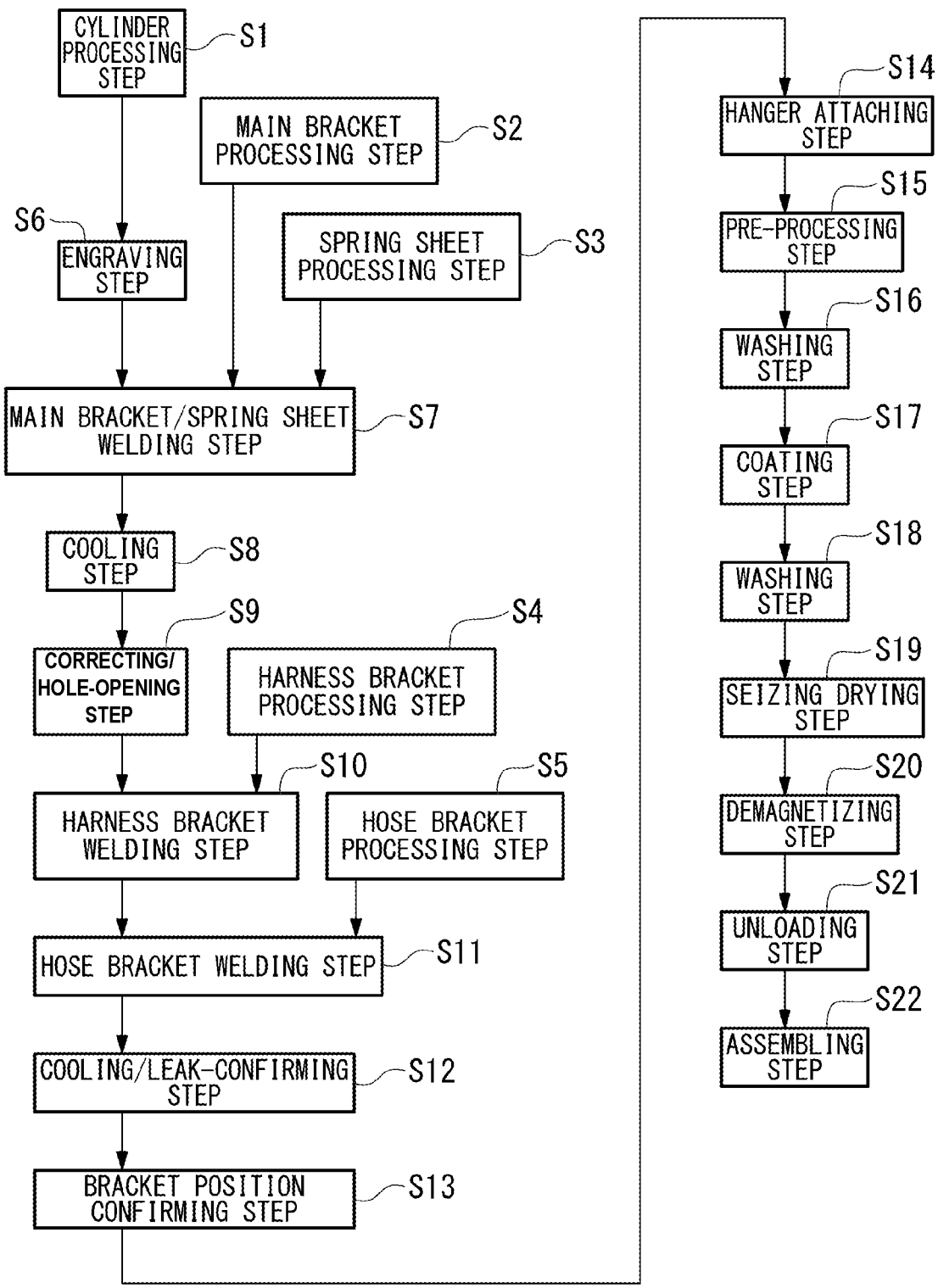
FIG. 2 is a process diagram of the manufacturing method for the cylinder device in the embodiment according to the present invention.

In the manufacturing method for the cylinder device 11 in a first embodiment, as illustrated in FIG. 2, a cylinder processing step S1 for forming the cylinder 14 in a state in which the swaged part 34 is not formed (hereinafter referred to as "before swaged"), a main bracket processing step S2 for forming the main bracket 15 including press processing, a spring sheet processing step S3 for forming the spring sheet 16 including press processing, a harness bracket processing step S4 for forming the harness bracket 17 including press processing, and a hose bracket processing step S5 for forming the hose bracket 18 including press processing are performed.

Figure 3:
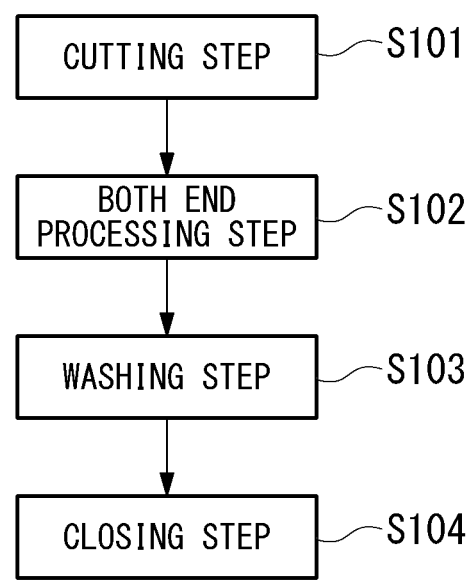
FIG. 3 is a process diagram of a cylinder processing step of the manufacturing method for the cylinder device in the embodiment according to the present invention.

As illustrated in FIG. 3, the cylinder processing step S1 includes a cutting step S101 for cutting a steel pipe as a material to a predetermined length, for example, using a metal saw, a both end processing step S102 for turning end surfaces of both end portions and inner diameter surfaces of the steel pipe cut in the cutting step S101, a washing step S103 for washing the steel pipe which has been subjected to the both end processing step S102 using a solvent, and a closing step S104 for closing one end of the steep pipe which has been subjected to the washing step S103 by plastically deforming the one end through hot forming to form the bottom portion 22 and forms the cylinder 14 before swaged. The cylinder processing step S1 includes processing to reduce a thickness through swaging to reduce a thickness of the swaged part 34 including the opening portion 23.

When the main bracket 15 is configured of a plurality of components, the main bracket processing step S2 includes a step for forming each of these components through press forming and a step for joining these components through electrical resistance welding such as projection welding, spot welding, seam welding, and so on.

After the cylinder processing step S1, an engraving step S6 for engraving the cylinder 14 before swaged is performed.

After the engraving step S6, a main bracket/spring sheet welding step S7 for welding the main bracket 15 formed in the main bracket processing step S2 and the spring sheet 16 formed in the spring sheet processing step S3 to the cylinder 14 is performed. In the main bracket/spring sheet welding step S7, the main bracket 15 and the spring sheet 16 are welded to the cylinder 14 through carbon dioxide gas arc welding.

After the main bracket/spring sheet welding step S7, a cooling step S8 for cooling the cylinder 14 to which the main bracket 15 and the spring sheet 16 are welded is performed.

After the cooling step S8, a correcting/hole-cutting step S9 for correcting the cylinder 14 to which the main bracket 15 and the spring sheet 16 are welded and cutting a hole at a predetermined position is performed.

After the correcting/hole-cutting step S9, a harness bracket welding step S10 for welding the harness bracket 17 formed in the harness bracket processing step S4 to the side wall portion 21 of the cylinder 14 to which the main bracket 15 and the spring sheet 16 are welded is performed.

In the harness bracket welding step S10, the harness bracket 17 is welded to the cylinder 14 through the carbon dioxide gas arc welding.

After the harness bracket welding step S10, a hose bracket welding step S11 (a welding step) for fixing the hose bracket 18 formed in the hose bracket processing step S5 to the outer circumferential portion of the side wall portion 21 of the cylinder 14 to which the main bracket 15, the spring sheet 16, and the harness bracket 17 are welded through welding is performed. In the hose bracket welding step S11, the hose bracket 18 is welded to the cylinder 14 through electrical resistance welding such as projection welding, spot welding, seam welding, and so on.

After the hose bracket welding step S11, a cooling/leak-confirming step S12 for cooling the cylinder 14 to which the main bracket 15, the spring sheet 16, the harness bracket 17, and the hose bracket 18 are welded and checking the tightness of the cylinder 14 is performed.

After the cooling/leak-confirming step S12, a bracket position confirming step S13 for checking whether mounting positions of the main bracket 15, the harness bracket 17, and the hose bracket 18 on the cylinder 14 are appropriate is performed.

Figure 4:
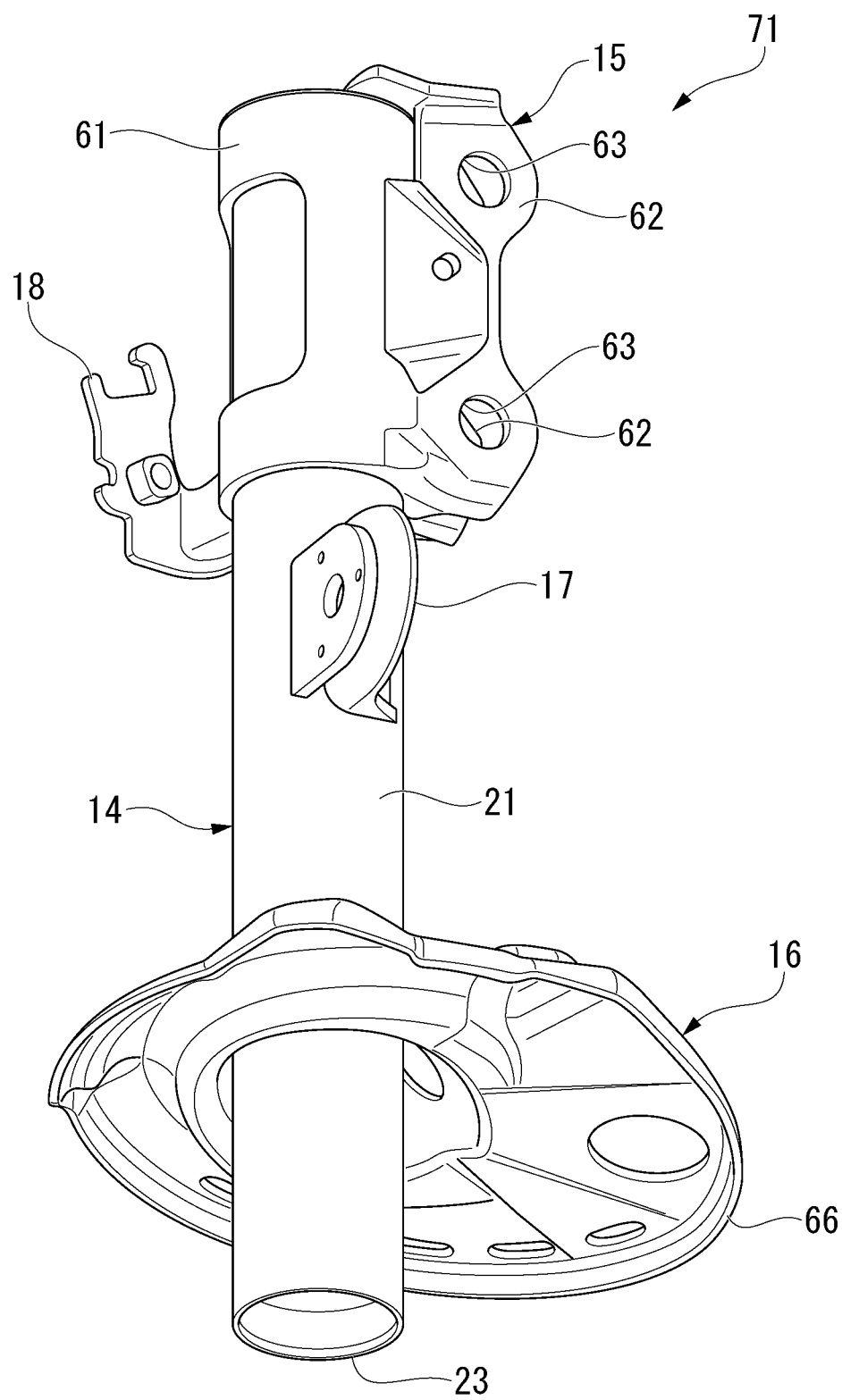
FIG. 4 is a perspective view illustrating a cylinder joined body of the cylinder device manufactured through the manufacturing method for the cylinder device in the embodiment according to the present invention.

As described above, a cylinder joined body 71 illustrated in FIG. 4 obtained by welding the main bracket 15, the spring sheet 16, the harness bracket 17, and the hose bracket 18 to the cylinder 14 before swaged is manufactured.

Figure 5:
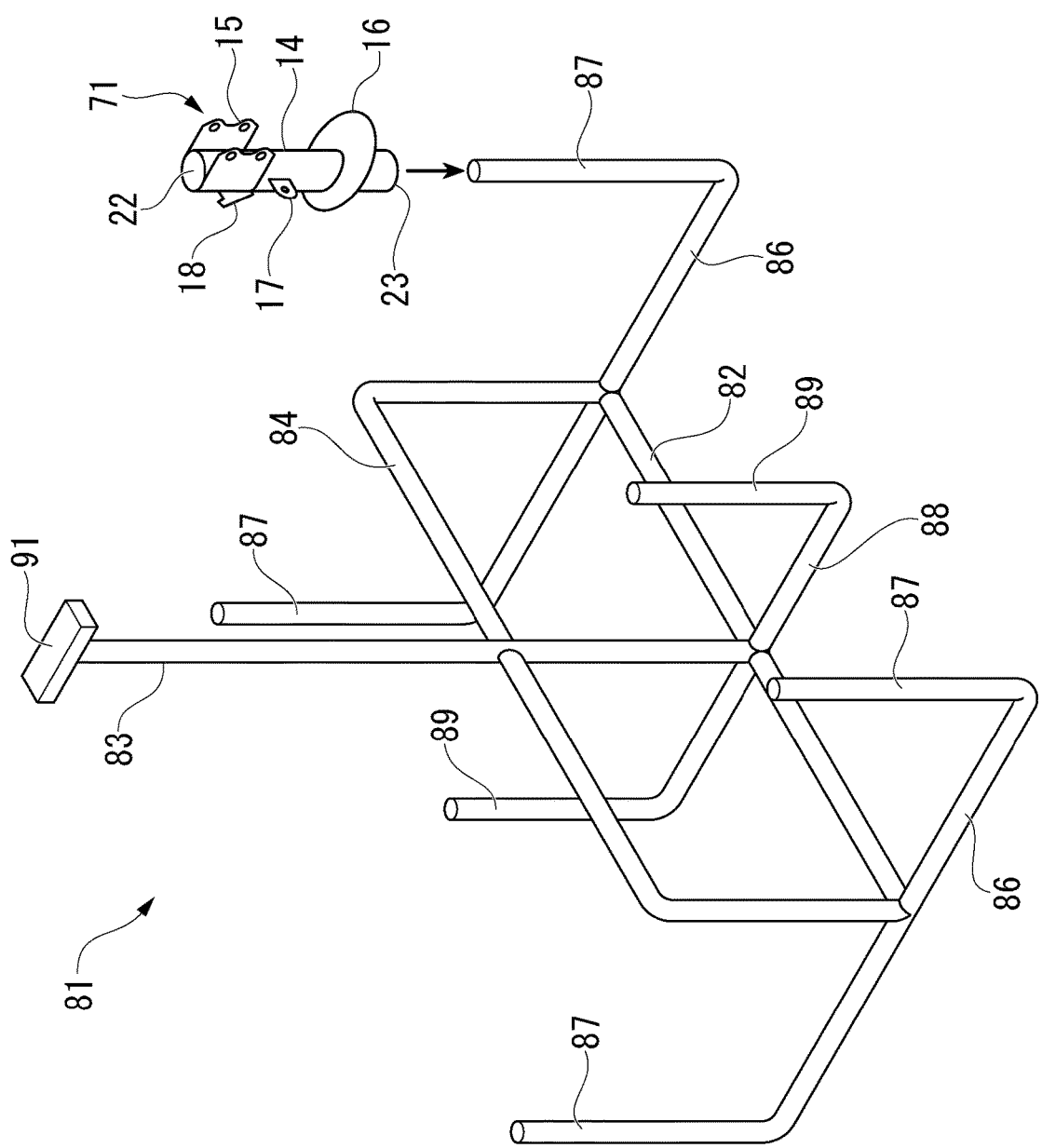
FIG. 5 is a perspective view illustrating a hanger used in the manufacturing method for the cylinder device in the embodiment according to the present invention.

Subsequently, a hanger attaching step S14 for attaching the above-described cylinder joined body 71 to a hanger 81 illustrated in FIG. 5 is performed. The hanger 81 has a straight linear base rod part 82 in a horizontal direction and a hanging rod part 83 extending vertically upward from a center of the base rod part 82 in a length direction thereof. Furthermore, the hanger 81 has a joint rod part 84 configured to connect both end portions of the base rod part 82 in the length direction thereof to a central portion of the hanging rod part 83 in a length direction thereof. The base rod part 82 and the joint rod part 84 have a quadrangular frame shape as a whole.

Also, the hanger 81 has laterally-long rod parts 86 in a horizontal direction which is perpendicular to the base rod part 82 at both end portions of the base rod part 82 in the length direction and long support rod parts 87 extending vertically upward from the laterally-long rod parts 86 at both end portions of each of the laterally-long rod parts 86 on both sides. Furthermore, the hanger 81 has laterally-short rod parts 88 in a horizontal direction which is perpendicular to the base rod part 82 at a central portion of the base rod part 82 in the length direction thereof and short support rod parts 89 extending vertically upward from the laterally-short rod parts 88 at both end portions of the laterally-short rod parts 88.

The laterally-long rod parts 86 on both sides have the same length and a length longer than that of the laterally-short rod parts 88. In addition, all of the laterally-long rod parts 86 on both sides and the laterally-short rod part 88 are joined to the base rod part 82 at the central position in the length direction. Furthermore, the four long support rod parts 87 have the same length and the two short support rod parts 89 also have the same length. The long support rod parts 87 have a length longer than that of the short support rod parts 89.

As described above, the laterally-long rod parts 86 and the laterally-short rod part 88 at one side, and the laterally-long rod parts 86 at the other side are disposed at equal intervals in the length direction of the base rod part 82. Thus, the long support rod parts 87 at one side, the short support rod parts 89 at one side, and the long support rod parts 87 at the other side are disposed at equal intervals in the length direction of the base rod part 82. The laterally-short rod part 88, the short support rod part 89, and the hanging rod part 83 are provided at the same position in the length direction of the base rod part 82.

Figure 6:
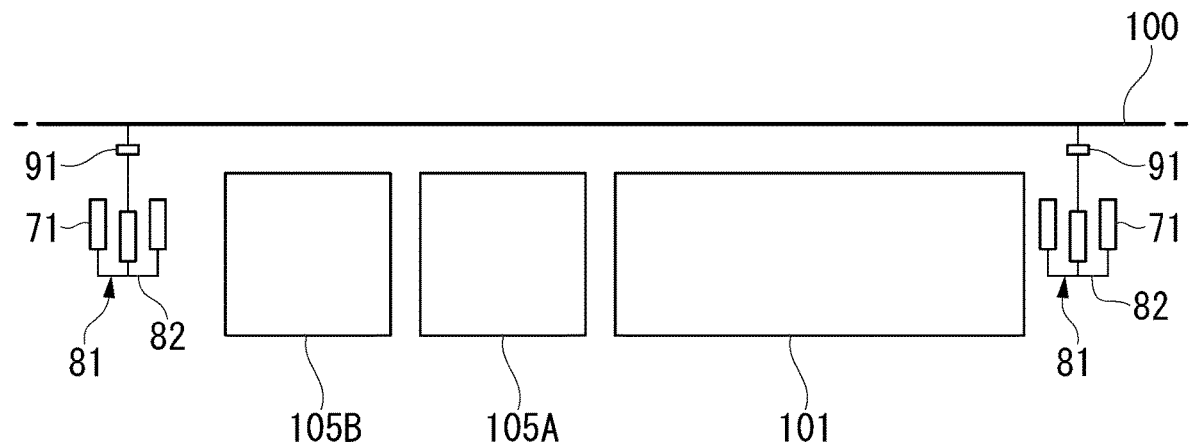
FIG. 6 is a side view schematically illustrating a hanger, a conveyor, a coating machine, and a demagnetizing device used in the manufacturing method for the cylinder device in the embodiment according to the present invention.

The hanging rod part 83 has a length longer than that of the long support rod part 87 and a joint part 91 joined to a conveyor 100 illustrated in FIG. 6 is provided at an upper end thereof.

In the hanger attaching step S14, a maximum of six cylinder joined bodies 71 are attached to a total of six rod parts, i.e., the four long support rod parts 87 and the two short support rod parts 89. In the cylinder joined body 71, the cylinder 14 is made to cover above an attaching destination of the long support rod part 87 and the short support rod part 89 through the opening portion 23. Thus, at this time, the bottom portion 22 is supported while being in contact with an upper end portion of the attaching destination of the long support rod part 87 and the short support rod part 89. In other words, in the hanger 81, the long support rod part 87 and the short support rod part 89 inserted into the cylinder 14 of the cylinder joined body 71 through the opening portion 23 and being in contact with the bottom portion 22 support the cylinder joined body 71.

As described above, the hanger 81 while supporting the cylinder joined body 71 is hung from the conveyor 100 at the joint part 91 as illustrated in FIG. 6 and is automatically conveyed using the conveyor 100. At this time, the hanger 81 is conveyed in a posture in which the base rod part 82 is in a conveyance direction of the conveyor 100. In this way, while the hanger 81 is conveyed using the conveyor 100, the cylinder joined body 71 supported by the hanger 81 is caused to pass through a coating machine 101. In the hanger 81, the long support rod parts 87 and the short support rod part 89 at one side, and the long support rod parts 87 at the other side are disposed at equal intervals in the conveyance direction of the conveyor 100.

In the coating machine 101, the cylinder joined body 71 is first subjected to pre-processing for performing coating in a pre-processing step S15, is subjected to washing in the washing step S16, and then is subjected to coating in a coating step S17. For example, the coating step S17 includes dip coating in which the cylinder joined body 71 supported by the hanger 81 is dipped in a paint together with the hanger 81. After the coating step S17, the coating machine 101 performs washing in the washing step S18 and then performs baking and drying in a baking-drying step S19. The cylinder joined body 71 which has been subjected to the baking and drying is moved outside of the coating machine 101 through conveyance of the conveyor 100. That is to say, the cylinder joined body 71 including the cylinder 14 is subject to the coating step S17 while being moved in the coating machine 101 in a state in which the cylinder joined body 71 is hung on the hanger 81.

The coating and the baking and drying is performed in the coating machine 101 while the conveyance is performed through the conveyor 100. Subsequently, the cylinder joined body 71 moved outside of the coating machine 101 is conveyed and is introduced into a demagnetizing device 105A, and passes through the demagnetizing device 105A. Subsequently, the cylinder joined body 71 is introduced into a demagnetizing device 105B downstream of the demagnetizing device 105A in the conveyance direction and passes through the demagnetizing device 105B. The cylinder joined body 71 is subjected to demagnetization while passing through the demagnetizing devices 105A and 105B in a demagnetizing step S20. That is to say, the demagnetizing step S20 is performed by moving the cylinder joined body 71 including the cylinder 14 in a state in which the cylinder joined body 71 including the cylinder 14 is hung on the hanger 81 in the demagnetizing devices 105A and 105B, following the coating step S17 in a state in which the cylinder joined body 71 including the cylinder 14 is hung on the hanger 81. In other words, in the coating step S17, the cylinder joined body 71 including the cylinder 14 coated while being hung on the hanger 81 is subjected to demagnetization in the demagnetizing step S20 without being removed from the hanger 81.

Figure 7:
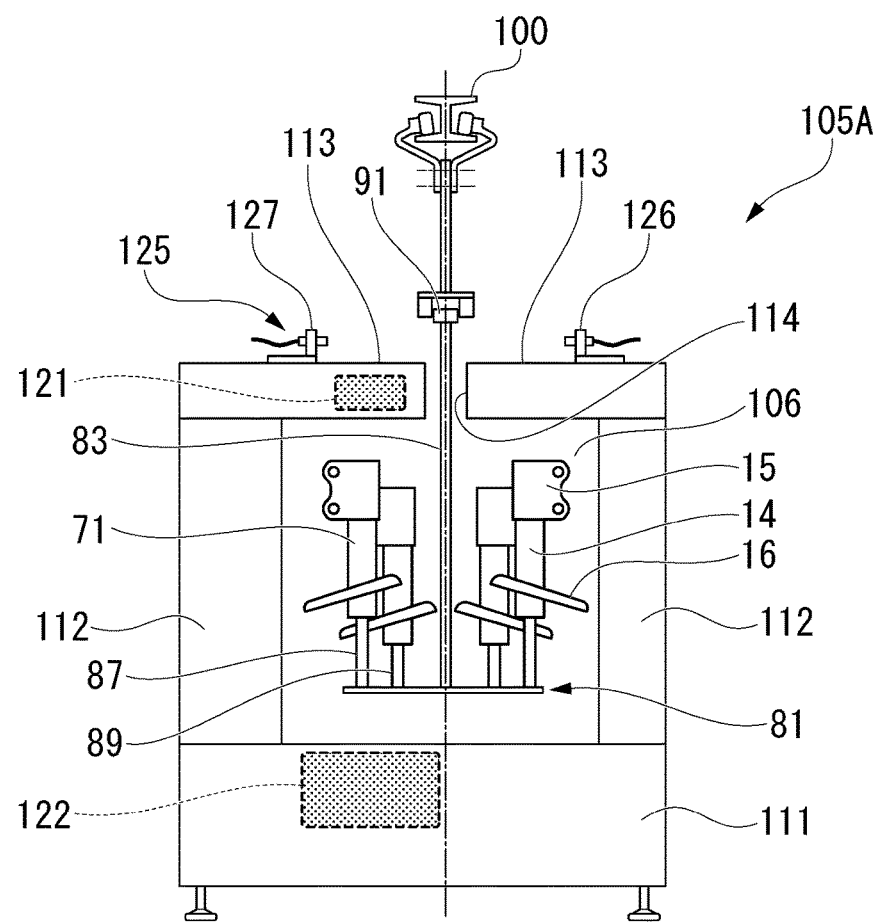
FIG. 7 is a front view illustrating the hanger, the conveyor, and an upstream demagnetizing device used in the manufacturing method for the cylinder device in the embodiment according to the present invention.

As illustrated in FIG. 7, of the demagnetizing devices 105A and 105B, the cylinder joined body 71 set on the hanger 81 and conveyed using the conveyor 100 is caused to pass through the demagnetizing device 105A on the upstream side in the conveyance direction together with the hanger 81 and the demagnetizing device 105A on the upstream side in the conveyance direction has a demagnetizing chamber 106 through which the hanger 81 and the cylinder joined body 71 pass. The demagnetizing device 105A has a base part 111 disposed below the hanger 81 to be conveyed using the conveyor 100, a pair of wall parts 112 vertically disposed parallel to the conveyor 100 on both sides of the conveyor 100 in the horizontal direction and extending upward from the base part 111, and a pair of ceiling parts 113 extending from upper end edge portions of the pair of wall parts 112 in a direction in which they approach each other. The demagnetizing chamber 106 is formed to be surrounded by the base part 111, the pair of wall parts 112, and the pair of ceiling parts 113 and a portion between the pair of ceiling parts 113 is an upper opening passage 114 through which the hanging rod part 83 of the hanger 81 passes. The conveyor 100 is conveyed from the back toward in front of the paper in FIG. 7.

In the demagnetizing device 105A, an upper coil 121 is provided on one side in a leftward/rightward direction when viewed in a direction in which the hanger 81 travels using the conveyance of the conveyor 100, specifically, on a ceiling part 113 on the left side in the direction in which the hanger 81 travels using the conveyance of the conveyor 100.

Also, in the demagnetizing device 105A, a lower coil 122 is provided at a position of the base part 111 vertically below the upper coil 121. The demagnetizing device 105A demagnetizes the cylinder joined body 71 supported by two long support rod parts 87 on the left side in the direction in which the passing hanger 81 travels and one short support rod part 89 on the left side in the direction in which the passing hanger 81 travels through a current attenuation method using the upper coil 121 and the lower coil 122 in which positions thereof in a horizontal direction overlap.

Figure 8:
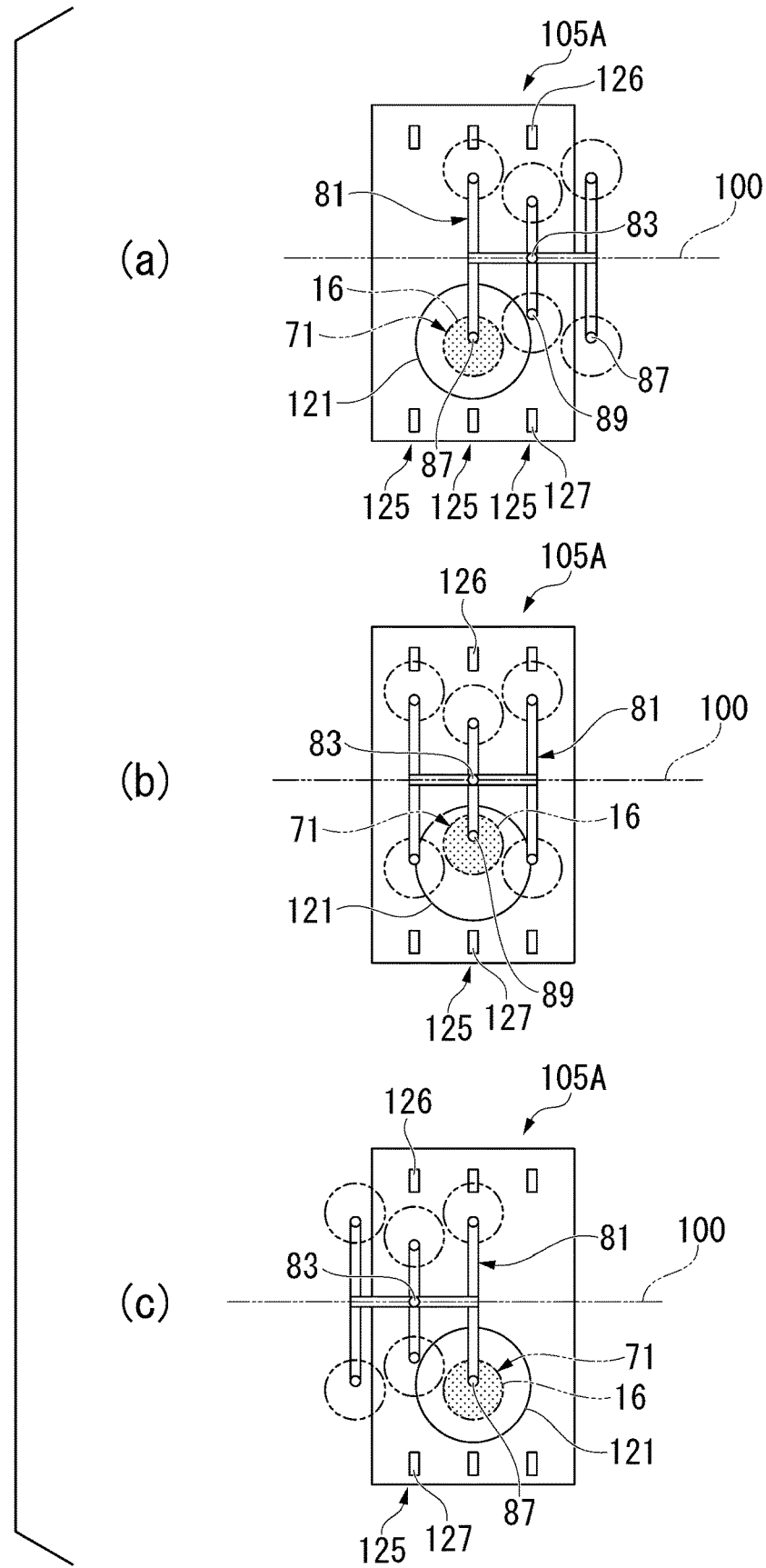
FIG. 8 is a plan view for explaining a demagnetizing step using the upstream demagnetizing device used in the manufacturing method for the cylinder device in the embodiment according to the present invention.

In the demagnetizing device 105A, sensors 125 configured to detect the hanging rod part 83 of the hanger 81 are provided in the ceiling parts 113. Each of the sensors 125 is configured of a light emitting element 126 and a light receiving element 127 whose positions are aligned in an upward/downward direction and in the direction in which the conveyor 100 is conveyed. When the light emitted from the light emitting element 126 is received by the light receiving element 127, the hanging rod 83 is not detected, and when it turned to be in the state in which the light emitted from the light emitting element 126 is no longer received by the light receiving element 127, the hanging rod part 83 is detected. As illustrated in FIG. 8, three sensors 125 are provided at the same interval as the interval between the long support rod part 87 and the short support rod part 89 in the direction in which the conveyor 100 is conveyed. In the others, the sensors 125 are provided at the same interval as the cylinder joined body 71 supported by the hanger 81 in the direction in which the conveyor 100 is conveyed.

As illustrated in FIG. 8(a), in the direction in which the conveyor 100 is conveyed, in the demagnetizing device 105A, positions of the long support rod part 87 on the top left side in the direction in which the hanger 81 travels, the upper coil 121, and the lower coil 122 in the horizontal direction overlap at a timing at which the sensor 125 on the furthest upstream side detects the hanging rod part 83 of the hanger 81. At this timing, the demagnetizing device 105A demagnetizes the cylinder joined body 71 supported by the long support rod part 87 on the head left side in the traveling direction by causing a demagnetizing current to flow through the upper coil 121 and the lower coil 122.

Also, as illustrated in FIG. 8(b), in the direction in which the conveyor 100 is conveyed, in the demagnetizing device 105A, positions of the short support rod part 89 on the left side in the direction in which the hanger 81 travels, the upper coil 121, and the lower coil 122 in the horizontal direction overlap at a timing at which the intermediate sensor 125 detects the hanging rod part 83 of the hanger 81. At this timing, the demagnetizing device 105A demagnetizes the cylinder joined body 71 supported by the short support rod part 89 on the left side in the traveling direction by causing a demagnetizing current to flow through the upper coil 121 and the lower coil 122.

Furthermore, as illustrated in FIG. 8(c), in the direction in which the conveyor 100 is conveyed, in the demagnetizing device 105A, positions of the long support rod part 87 on the rearmost left side in the direction in which the hanger 81 travels, the upper coil 121, and the lower coil 122 in the horizontal direction overlap at a timing at which the sensor 125 on the furthest downstream side detects the hanging rod part 83 of the hanger 81. At this timing, the demagnetizing device 105A demagnetizes the cylinder joined body 71 supported by the long support rod part 87 on the rearmost left side in the traveling direction by causing a demagnetizing current to flow through the upper coil 121 and the lower coil 122.

Figure 9:
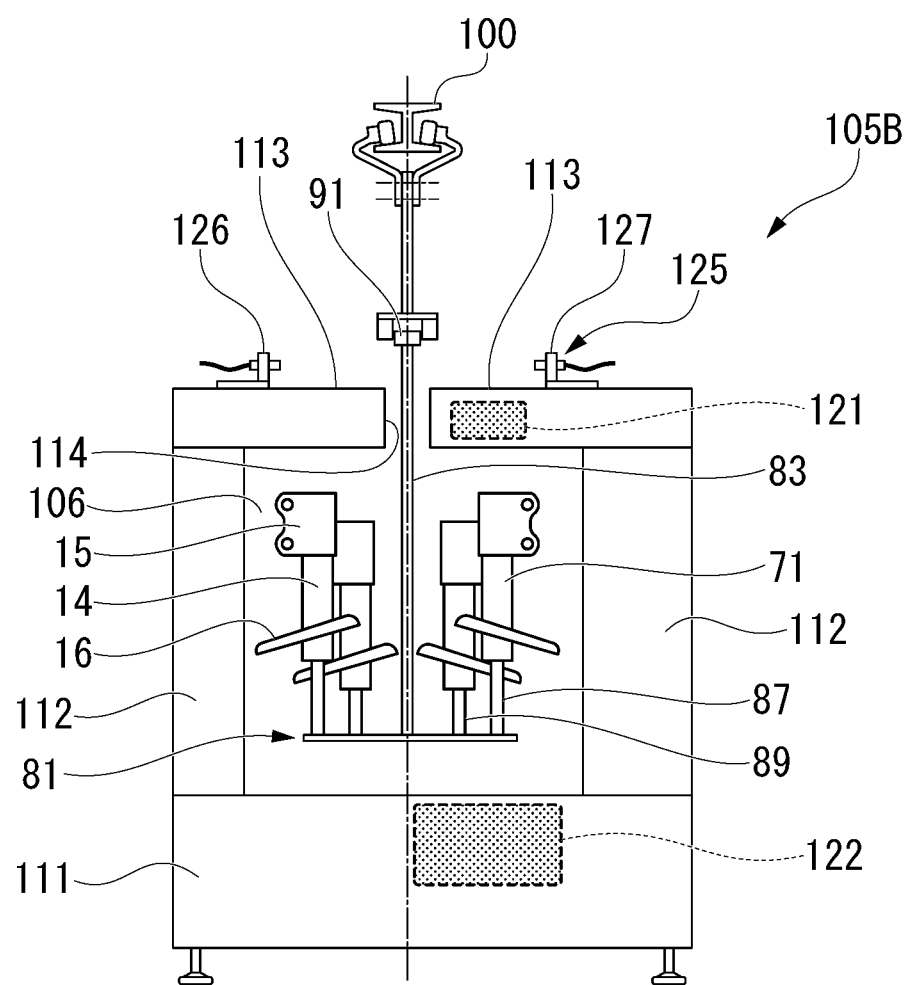
FIG. 9 is a front view illustrating the hanger, the conveyor, and a downstream demagnetizing device used in the manufacturing method for the cylinder device in the embodiment according to the present invention.

As illustrated in FIG. 9, in the demagnetizing device 105B on the downstream side in the conveyance direction, when viewed in the direction in which the hanger 81 travels through the conveyance of the conveyor 100, the upper coil 121 is provided on the ceiling part 113 on a side opposite to that of the demagnetizing device 105A in a leftward/rightward direction, specifically, on the right side in the traveling direction. Furthermore, the lower coil 122 is provided at a position on the base part 111 vertically below the upper coil 121. Thus, the downstream demagnetizing device 105B demagnetizes the cylinder joined body 71 supported by two long support rod parts 87 on the right side in the direction in which the passing hanger 81 travels and one short support rod part 89 on the right side in the direction in which the passing hanger 81 travels through a current attenuation method using the upper coil 121 and the lower coil 122. The conveyor 100 is conveyed from the back toward the front of the paper in FIG. 9.

Also in the demagnetizing device 105B on the downstream side in the conveyance direction, three sensors 125 configured to detect the hanging rod part 83 of the hanger 81 as in the upstream demagnetizing device 105A are provided at the same interval as the interval between the long support rod part 87 and the short support rod part 89 in the direction in which the conveyor 100 is conveyed.

In the demagnetizing device 105B, in the direction in which the conveyor 100 is conveyed, positions of the long support rod part 87 on the head right side in the direction in which the hanger 81 travels, the upper coil 121, and the lower coil 122 in the horizontal direction overlap at a timing at which the sensor 125 on the furthest upstream side detects the hanging rod part 83 of the hanger 81. At this timing, the demagnetizing device 105B demagnetizes the cylinder joined body 71 supported by the long support rod part 87 on the head right side in the traveling direction by causing a demagnetizing current to flow through the upper coil 121 and the lower coil 122.

Also, in the direction in which the conveyor 100 is conveyed, in the demagnetizing device 105B, positions of the short support rod part 89 on the right side in the direction in which the hanger 81 travels, the upper coil 121, and the lower coil 122 in the horizontal direction overlap at a timing at which the intermediate sensor 125 detects the hanging rod part 83 of the hanger 81. At this timing, the demagnetizing device 105B demagnetizes the cylinder joined body 71 supported by the short support rod part 89 on the right side in the traveling direction by causing a demagnetizing current to flow through the upper coil 121 and the lower coil 122.

Furthermore, in the direction in which the conveyor 100 is conveyed, in the demagnetizing device 105B, positions of the long support rod part 87 on the rear right side in the direction in which the hanger 81 travels, the upper coil 121, and the lower coil 122 in the horizontal direction overlap at a timing at which the sensor 125 on the downstream side detects the hanging rod part 83 of the hanger 81. At this timing, the demagnetizing device 105B demagnetizes the cylinder joined body 71 supported by the long support rod part 87 on the rearmost right side in the traveling direction by causing a demagnetizing current to flow through the upper coil 121 and the lower coil 122.

As described above, before the demagnetizing step S20, the coating step S17 for performing coating the outer circumferential side of the cylinder joined body 71 including the outer circumferential side of the cylinder 14 and the baking-drying step S19 for drying the cylinder joined body 71 including the outer circumference side of the cylinder 14 are performed in this order. Furthermore, before the coating step S17, the hose bracket welding step S11 for welding the hose bracket 18 to the cylinder 14 through electrical resistance welding is performed. Thus, the coating step S17 for coating the outer circumference side of the cylinder 14 is performed between the hose bracket welding step S11 and the demagnetizing step S20. In addition, after the coating step S17, the baking-drying step S19 is performed and then the demagnetizing step S20 is performed.

In the demagnetizing step S20, if the hanger 81 is conveyed using the conveyor 100 and passes through the two demagnetizing devices 105A and 105B, a total of six cylinder joined bodies 71 supported by the hanger 81 are demagnetized. The cylinder joined body 71 demagnetized in this way is removed from the hanger 81 in an unloading step S21 and the process proceeds to a process of an assembling step S22.

Thus, in the assembling step S22, built-in components are assembled on the cylinder joined body 71.

Here, in each of the built-in components, the base member 30 is fitted to one end of the inner cylinder 12 illustrated in FIG. 1 and the piston 35 having the piston rod 41 attached thereto is fitted into the inner cylinder 12. Furthermore, the built-in component is configured so that the rod guide 31 is fitted to the other end of the inner cylinder 12 such that the piston rod 41 is inserted into the built-in component and the seal member 33 is disposed on an outer side of the rod guide 31 such that the piston rod 41 is inserted into the built-in component. The built-in components are separately assembled in such a state.

Moreover, in the assembling step S22, the built-in components are inserted into the cylinder joined body 71 through the opening portion 23, the rod guide 31 and the seal member 33 serving as a sealing member are caused to be fitted to the cylinder 14, and the base member 30 is brought into contact with the bottom portion 22. After that, a swaged step for forming the swaged part 34 by curling the opening portion 23 side of the side wall portion 21 inward through curling is performed while the seal member 33 is pressed against the rod guide 31. The cylinder device 11 is manufactured via the assembling step S22 including the swaged step. In this way, the assembling step S22 is a step for assembling the piston 35, the piston rod 41, and the seal member 33 in the cylinder 14 through the opening portion 23.

Patent Literature 1 described above describes that a magnetized tire is demagnetized. In the meantime, there is a demand for improving the sealing performance in the cylinder device. When the cylinder device 11 is manufactured, in the assembling step S22, as described above, the piston 35, the piston rod 41, the seal member 33, and the like are assembled into the cylinder 14 of the cylinder joined body 71 through the opening portion 23. The hose bracket 18 is welded to the cylinder 14 through electrical resistance welding in the hose bracket welding step S11 performed before the assembling step S22, which cases the cylinder 14 to be excited and magnetized through this electrical resistance welding. If particularly the opening portion 23 of the cylinder 14 is magnetized, metal foreign matter such as cutting powder is likely to adhere to the inside of the opening portion 23 due to a magnetic force. The metal foreign matter is likely to damage the seal member 33 when the seal member 33 is assembled to the opening portion 23 or is likely to be caught between the seal member 33 and the cylinder 14. Thus, the sealing performance of the cylinder device 11 is likely to decrease, and in some cases, a working fluid is likely to leak from the cylinder 14.

On the other hand, in this embodiment, after the hose bracket welding step S11 for fixing the hose bracket 18 to the cylinder 14 through electrical resistance welding, the demagnetizing step S20 for demagnetizing the cylinder 14 including the opening portion 23 is performed. After that, the assembling step S22 for assembling the piston 35, the piston rod 41, the seal member 33, and the like in the cylinder 14 through the opening portion 23 is performed.

Thus, when the seal member 33 is assembled, the cylinder 14 is demagnetized. Thus, adsorption of metal foreign matters such as a cut powder to the cylinder 14 is prevented. Therefore, it is possible to prevent damage when the seal member 33 is assembled to the opening portion 23 and metal foreign matter becomes caught between the seal member 33 and the cylinder 14. Accordingly, it is possible to improve the sealing performance of the cylinder device 11.

Also, the coating step S17 for coating the outer circumference side of the cylinder joined body 71 including the outer circumference side of the cylinder 14 is provided between the hose bracket welding step S11 and the demagnetizing step S20. Thus, for example, when the cylinder 14 is subjected to the coating step S17 while being moved in the coating machine 101 in a state in which the cylinder 14 is hung on the hanger 81, after the coating is performed, it is possible to perform the demagnetizing step S20 while the cylinder 14 is hung on the hanger 81. Furthermore, after the coating is performed, the baking-drying step S19 for drying the cylinder 14 is performed. After that, when the demagnetizing step S20 is performed, after the coating is performed, it is possible to perform the baking-drying step S19 and further perform the demagnetizing step S20 while the cylinder 14 is hung on the hanger 81.

Thus, it is possible to demagnetize the cylinder joined body 71 by passing through the demagnetizing devices 105A and 105B without removing the cylinder joined body 71 from the hanger 81.

The demagnetizing step S20 may be performed after the welding step S11 and before the coating step S17, so that the coating may be performed after the demagnetization is performed. In this case, the hanger attaching step S14 is performed and the cylinder joined body 71 set on the hanger 81 is subjected to the demagnetizing step S20 using the demagnetizing devices 105A and 105B while the cylinder joined body 71 set on the hanger 81 is conveyed using the conveyor 100. After that, the cylinder joined body 71 set on the hanger 81 is subjected to the pre-processing step S15, the washing step S16, the coating step S17, the washing step S18, and the baking-drying step S19 in the coating machine 101 while conveyed using the conveyor 100 as it is.

In the cylinder processing step S1, in order to reduce the thickness of the swaged part 34 including the opening portion 23, a process for reducing the thickness through swaging is performed. Thus, a cut powder and the like is highly likely to adhere to the swaged part 34. On the other hand, since the cylinder processing step S1 including swaging is performed before the demagnetizing step S20, the effect obtained by performing the demagnetizing step S20 is significant.

Although the entire cylinder joined body 71 including the cylinder 14 is demagnetized in the demagnetizing step S20 in the above-described embodiment, in order to prevent an influence of metal foreign matters when the seal member 33 is assembled to the opening portion 23 of the cylinder 14, at least the opening portion 23 of the cylinder 14 may be demagnetized.

A first aspect of the above-described embodiment is a manufacturing method for a cylinder device which includes: a cylinder having one side having an opening portion provided therein; a piston provided in the cylinder; a piston rod having one side coupled to the piston and the other side extending from the cylinder; a seal member provided in the opening portion of the cylinder and configured to seal a working fluid sealed in the cylinder; and a mounting member provided on an outer circumferential side of the cylinder, the method includes: a welding step for fixing the mounting member to the cylinder through electrical resistance welding; a demagnetizing step for demagnetizing at least the opening portion of the cylinder; and an assembling step for assembling the piston, the piston rod, and the seal member to the cylinder through the opening portion.

According to a second aspect, in the first aspect, a coating step for coating the outer circumferential side of the cylinder is provided between the welding step and the demagnetizing step.

According to a third aspect, in the second aspect, the coating step is performed while the cylinder is moved in a coating machine in a state in which the cylinder is hung on a hanger and performing the demagnetizing step in a state in which the cylinder is hung on the hanger.

According to a fourth aspect, in the second or third aspect, a drying step for drying the cylinder is performed after the coating step and then the demagnetizing step is performed.

According to a fifth aspect, in any one of the first to fourth aspects, a swaging step for reducing a diameter of the opening portion of the cylinder is performed before the demagnetizing step.

INDUSTRIAL APPLICABILITY

According to the present invention, it is possible to improve the sealing performance.

REFERENCE SIGNS LIST

- 11 Cylinder device
- 14 Cylinder
- 18 Hose bracket (mounting member)
- 23 Opening portion
- 33 Seal member
- 35 Piston
- 41 Piston rod
- 81 Hanger
- 101 Coating machine
- 105A, 105B Demagnetizing device
- S11 Hose bracket welding step (welding step)
- S17 Coating step
- S19 Baking-drying step (drying step)
- S20 Demagnetizing step
- S22 Assembling step

The invention claimed is:

1. A manufacturing method for a cylinder device which includes:
    a cylinder having one side having an opening portion provided therein;
    a piston provided in the cylinder;
    a piston rod having one side coupled to the piston and the other side extending from the cylinder;
    a seal member provided in the opening portion of the cylinder and configured to seal a working fluid sealed in the cylinder; and
    a mounting member provided on an outer circumferential side of the cylinder, the method comprising:
    a welding step for fixing the mounting member to the cylinder through electrical resistance welding;
    a demagnetizing step for demagnetizing at least the opening portion of the cylinder;
    a coating step for coating the outer circumferential side of the cylinder, performed between the welding step and the demagnetizing step; and
    an assembling step for assembling the piston, the piston rod, and the seal member to the cylinder through the opening portion, wherein
    in a duration from the coating step to the demagnetizing step, coating and demagnetizing of the cylinder are performed without removing the cylinder from a hanger.

2. The manufacturing method for a cylinder device according to claim 1, further comprising:
    a drying step for drying the cylinder after the coating step, wherein the demagnetizing step is performed after the drying step.

3. The manufacturing method for a cylinder device according to claim 1, further comprising:
    a swaging step for reducing a diameter of the opening portion of the cylinder performed before the demagnetizing step.

* * * * *